United States Patent [19]
Uesugi et al.

[11] Patent Number: 5,312,064
[45] Date of Patent: May 17, 1994

[54] METHOD AND APPARATUS FOR PLATE WINDING OF LONG SHEET

[75] Inventors: Yuji Uesugi, Osaka; Koji Kunami; Noriyuki Inagaki, both of Hirakata; Junichi Hikino, Matsue; Shinichi Suzawa, Nita, all of Japan

[73] Assignee: Matsushita Electric Industrial Co., Ltd., Osaka, Japan

[21] Appl. No.: 871,986

[22] Filed: Apr. 22, 1992

[30] Foreign Application Priority Data

Apr. 30, 1991 [JP] Japan ................................ 3-098625

[51] Int. Cl.$^5$ ...................... B65H 18/08; B65H 75/06
[52] U.S. Cl. .................................. 242/67.1 R; 242/61
[58] Field of Search ........... 242/67.1 R, 61, 62, 242/71.8, 64, 68.1, 67.5, 68, 68.5; 226/190–191, 194

[56] References Cited

U.S. PATENT DOCUMENTS 4,500,044 2/1985 Schnell ............................ 242/62
5,005,778 4/1991 Gladish ..................... 242/67.1 R Primary Examiner—William A. Cuchlinski, Jr.
Assistant Examiner—William C. Dowling
Attorney, Agent, or Firm—Wenderoth, Lind & Ponack

[57] ABSTRACT

A method of winding a long sheet continuously around the plate bobbin comprises the steps of repeatedly moving in one direction on an approximately circular locus a rotary shaft for winding, rotating the plate bobbin, repeating on a certain moving locus, repeatedly moving in the same direction or reciprocatingly the rotary shaft of the nip roll so that a nip roll disposed in an approximately parallel to the rotary shaft of the plate bobbin continuously move in one direction along the surface of the plate bobbin rotating from above the above described long sheet, depressing the long sheet against the above described plate bobbin so as to continuously wind it, thereby to wind a long sheet around a plate bobbin with better accuracy, higher speed without the air swallowing operation.

12 Claims, 13 Drawing Sheets

METHOD AND APPARATUS FOR PLATE WINDING OF LONG SHEET

BACKGROUND OF THE INVENTION

The present invention generally relates to a method and apparatus for plate winding of a long sheet to be used in a winding operation of a long film around a plate bobbin in the manufacturing of, for example, a laminated film capacitor.

A conventional method of winding a long film around a plate bobbin will be described hereinafter with reference to FIG. 22 through FIG. 26. A method of rotating a conventional plate bobbin 32 in the winding of a film 31 around the plate bobbin 32 is shown in FIG. 22. The plate bobbin 32 rotates in a direction of an arrow mark. Its rotary shaft 32a is in a home position and does not move. The film 31 advances in a direction of the arrow mark and is wound around the plate bobbin 32 through an expander roll 36.

FIG. 23 and FIG. 24 are side views showing the conventional plate winding method. The film 31 is wound around the plate bobbin 32 through pass rolls 33, 33a and 33b, a free dancer roll 34, a forced dancer roll 35 and the expander roll 36. The plate bobbin 32 rotates in the direction of an arrow mark, but its rotary shaft 32a is in a home position and does not move.

When the plate roll 32 is made to rotate at a constant speed in the drawing, the speed of the film 31 passing the expander roll 36 changes. When the plate bobbin 32 is in a position shown in FIG. 24, the speed of the film 31 passing the expander roll 36 becomes zero.

The forced dancer roll 35 performs a function of keeping constant the speed of the film 31 in front of the pass roll 33. The forced dancer roll 35 is forced to move in the direction of an arrow mark by a cam (not shown) so that the speed change of the film 31 caused at the expander roll 36 by the plate bobbin 32 does not affect the front of the pass roll 33. An error portion, wherein the speed change is not completely negated by the forced dancer roll 35, is negated by a free dancer roll 34, moved in the arrow mark direction.

The function of the expander roll 36 is shown in FIG. 25. The expander roll 36 is a roll curved in a direction as shown in FIG. 25, and the curved direction is adapted to be maintained the same if the expander roll 36 is rotated. The film 31 becomes larger in width at a point where it is separated from the expander roll 36 than its width at a point where it is in contact against the expander roll 36. Thus, the film 31 is expanded in the width direction, as indicated by the arrow marks 37. If wrinkles 38 are caused in, for example, the film 31, the wrinkles are removed after they have passed the expander roll 36 under proper conditions. The film is thus wound in a wrinkle-free condition around the plate bobbin 32.

A pass roll of a straight shape, instead of the expander roll 36, can be used. When the film 31 is thin, better winding conditions can be obtained with the expander roll 36.

The conventional plate winding method has the following problems.

When the plate bobbin 32 is rotated to the position of FIG. 24, the film 31 comes into contact at the same time against the whole face of the plate bobbin 32. When the film 31 is of a material through which it is hard to pass air, like an organic film, air is "swallowed up," or trapped, between the film 31 and the plate bobbin 32. As a result, after the film has been wound many times, the film 31a wound by the plate bobbin 32 is swollen, as shown in FIG. 26, thus resulting in an inferior winding operation. The trapping of the air is less when the winding speed is slow, and is more abrupt when the speed becomes fast.

When the winding operation of the film stops, the expander roll 36 stops for each half the rotation of the plate bobbin 32 so that a tension variation is caused in the film 31 by the inertia of the expander roll 36 when switching from stop to rotation. When the tension variation is normally 10% or more, wrinkles are likely to be caused in the film 31.

The winding speed of the plate bobbin 32 cannot be made larger because of the two reasons described above.

SUMMARY OF THE INVENTION

Accordingly, the present invention has been developed with a view to substantially eliminating the above discussed drawbacks inherent in the prior art, and has for its essential object the provision of an improved method and an apparatus for plate-winding long sheets.

Another important object of the present invention is to provide an improved method and apparatus for effecting a plate winding of a long sheet, such as a long film or the like, with a high accuracy and high speed, and without causing air swallowing and wrinkles.

In accomplishing these and other objects, a plate winding method of a long sheet in a first feature of the present invention comprises the steps of, in a continuous winding process of winding a long sheet around a plate bobbin, moving in one direction, repeatedly, on an approximately circular locus, a rotary shaft of a plate bobbin. The rotary shaft of a nip roll is repeatedly reciprocated in the same direction on a certain moving locus. The nip roll, disposed approximately parallel to the rotary shaft of the plate bobbin, may thus move continuously in one direction along the surface of the plate bobbin, rotated from above the long sheet, and continuously wind the long sheet with the long sheet being depressed against the plate bobbin.

A plate winding method of a long sheet according to a second feature of the present invention comprises the steps of, in a method of continuously winding a long sheet around a plate bobbin, winding, rotating the plate bobbin, moving a rotary shaft of the plate bobbin one cycle in one direction, or a reciprocating operation on a repeating moving locus, for 180 degree rotation of the above described plate bobbin, so that a nip roll disposed approximately parallel to the rotary shaft of the plate bobbin may move continuously in one direction along the surface of the plate bobbin and rotated from above the above described long sheet, thus continuously winding the long sheet around the plate bobbin with the long sheet being depressed against the plate bobbin so that the maximum length between two points on the moving locus may be made approximately one half of the length of the plate bobbin in the running direction of the long sheet.

In a plate winding method of a long sheet having the first and second features a forced dancer roll is disposed before the nip roll. The forced dancer roll is moved through the operative cooperation of the plate bobbin and the nip roll. Ideally the running speed of the film before the forced dancer roll may become approximately constant.

In a plate winding method with the first feature, the rotary shaft of the plate bobbin is ideally rotated by 180 degrees for each 360-degree movement on the approximately circular locus.

In a plate winding method with the second feature, ideally the diameter of the approximately circular locus of the rotary shaft of the plate bobbin is made larger so as to more closely approximate ½ of the length of the plate bobbin in the running direction of the long sheet, and ideally the envelope line of the end edge of the rotating plate bobbin has a concave.

In a plate winding method with the first and second features, ideally the moving locus of the rotary shaft of the nip roll is moved away from the plate bobbin in accordance with the increase of the thickness of the long sheet wound on the plate bobbin.

In accordance with the plate winding method with the first and second features, ideally the interval between the nip roll and the plate bobbin is an interval value for the plate bobbin when rotated by 90 degrees from the vertical direction greater than or equal to an interval value for the plate bobbin when rotated to 180 degrees from a position exceeding 90 degrees with respect to the vertical direction.

In a plate winding method having a third feature of the present invention, ideally a forced dancer roll is composed of an expander roll and a pass roll, which move together in an interlocking relationship.

A plate winding apparatus of a fourth feature of the present invention is provided with a gear A with a rotary shaft rotated in a given position, one or a plurality of epicyclic gears rotating on an approximately circular moving locus along the gear A and a plate bobbin mounted on one epicyclic gear B of the epicyclic gears, solving the above described problems. The ratio of the revolution number between the gear A and the epicyclic gear B, determined from the number of teeth of the respective gears, is Na to Nb. Na and Nb are the same code when the rotating direction is the same, and are different when rotating the inverse direction. When the epicyclic gear B has been rotated by one cycle on the above described approximately circular moving locus, the gear A is rotated by $\{0.5 \times (2-Na/Nb)\}$ cycles in the same direction as the rotating of the epicyclic gear B, and the plate bobbin is rotated by 180 degrees each time the rotary shaft of the plate bobbin moves by 360 degrees on an approximately circular movement locus.

The plate winding method having the first feature forms a basis of the present application, and has steps holding the nip roll disposed approximately parallel to the rotary shaft of the plate bobbin on the plate bobbin by approximately circular movement of the rotary shaft of the plate bobbin, effecting a winding rotation so as to make it easier to wind the long sheet, preventing the air swallowing condition, which is a problem of the conventional art, from being caused through contact of the long sheet against the full face of the plate bobbin. As the nip roll serves a function of normally driving the air away, a winding condition with better accuracy and with much less air swallowing can be obtained.

A plate winding method having the second feature, which has steps of moving by one cycle on the certain moving locus, each time the plate bobbin rotates by 180 degrees, has the rotary shaft of the nip roll disposed parallel to the rotary shaft of the plate bobbin on the plate bobbin to be wound. The nip roll is rotated by a rotary shaft to be rotated in a constant position, moving repeatedly in the same direction, or reciprocatingly on a certain moving locus, making it easy for the nip roll to adhere to the plate bobbin. The maximum length between two points on the repeating movement locus is made to be approximately ½ or less of the length of the plate bobbin in the running direction of the film. The air swallowing condition, which is a problem of the conventional art, is thus prevented from being caused through full face contact of the long sheet against the plate bobbin. As the nip roll serves a function of normally driving the air away, the winding conditions have better-accuracy with much less air swallowing.

A plate winding method with the third feature has the steps of disposing the forced dancer roll before the nip roll in addition to the functions of the first or second features of the invention. This makes the running speed of the long sheet approximately constant in front of the forced dancer roll, as the forced dancer roll is moved through operative cooperation with the movement of the plate bobbin and the nip roll, making small the changes in the rotational speed of the forced dancer roll as the rotation of the forced dancer roll is adapted not to stop even when the winding speed of the palate bobbin is 0, thus resulting in smaller tension changes in the long sheet, and fewer wrinkles.

A plate winding method having the fourth feature has steps of, in addition to the function of the first feature of the invention, making the moving distance of the nip roll small by rotation of the plate bobbin by 180 degrees each time the rotary shaft of the plate bobbin moves 360 degrees on the approximately circular locus, thus further being able to effect a high speed winding operation.

A plate winding method having a fifth feature of the present invention has the steps of, in addition to the function of the plate winding method in accordance with the fourth feature of the present invention, making larger the diameter of the approximately circular locus of the rotary shaft of the plate bobbin, making it closer to approximately ½ of the length of the plate bobbin in the running direction of the long sheet, making an envelope line of the end edge of the rotating plate bobbin a curved line having a concave portion, and making the movement distance of the nip roll extremely small so that a high speed winding operation can be further effected.

A plate winding method in a sixth feature of the present invention has the step of, in addition to the function of the first feature or the second feature, separating from the plate bobbin the moving locus of the rotary shaft of the nip roll in accordance with the increase in the winding thickness of the long sheet on the plate bobbin, preventing interference of the nip roll with the long sheet being laminated (wound).

A plate winding method in a seventh feature of the present invention has, in addition to the function of the first feature or the second feature, having the nip roll function as a dancer roll by having a portion separated from the plate bobbin during a rotation by 90 degrees from the vertical. The interval between the nip roll and the plate bobbin is an interval value which, for the plate bobbin to rotate by 90 degrees from the vertical direction, is greater than or equal to an interval value for the plate bobbin to rotate to 180 degrees from a position exceeding 90 degrees with respect to the vertical direction. Less movement of the forced dancer roll results, making less the maximum of the movement speed of the forced dancer roll, thus effecting a higher winding operation.

A plate winding method in an eighth feature of the present invention has the steps of, in addition to the function of the plate winding method described in accordance with the third feature, having the entering sheet and the exiting sheet approaching parallel with each other. The interval between the entering long sheet and the exiting long sheet includes two rolls constituting the forced dancer roll, a combination of the expander roll and the pass roll moving separately and vertically, with the interval being moved together in an interlocked relationship. A smaller movement distance of the forced dancer roll is necessary to obtain the same speed adjustment effect as compared with the conventional single forced dancer roll, so that a higher speed of the winding operation can be effected. An angle formed by the long sheet entering the expander roll and the long sheet coming out of the expander roll while retaining these effects is easier to set within the range of 100 degrees to 140 degrees suitable to the expander roll.

A plate winding apparatus in a ninth feature of the present invention is provided with a gear A with a rotary shaft being rotated in a given position, one epicyclic gear or a plurality of epicyclic gears rotating on an approximately circular moving locus along the gear A and a plate bobbin mounted on one epicyclic gear B of these epicyclic gears. The ratio of the revolution number between the gear A and the epicyclic gears B, to be determined from the number of the teeth of the respective gears, is Na to Nb. Na and Nb are both positive when the rotating direction is the same, and one of Na and Nb is negative when rotating direction of gear A and gear B are opposite. When the epicyclic gear B has been rotated by one cycle on the above-described approximately circular moving locus, the gear A is rotated by $\{0.5 \times (2 - Na/Nb)\}$ cycles in the same direction as the rotation of the epicyclic gear B. The plate bobbin is rotated by 180 degrees each time the rotary shaft of the plate bobbin moves by 360 degrees on an approximately circular movement locus so as to embody the plate winding method of a first invention of the present application, and the winding operation can be effected with high accuracy and high speed in a condition where air swallowing and wrinkles are not caused in the film.

BRIEF DESCRIPTION OF THE DRAWINGS

These and other objects and features of the present invention will become apparent from the following description taken in conjunction with a preferred embodiment thereof and with reference to the accompanying drawings, in which.

DETAILED DESCRIPTION OF THE INVENTION

Figure 1:
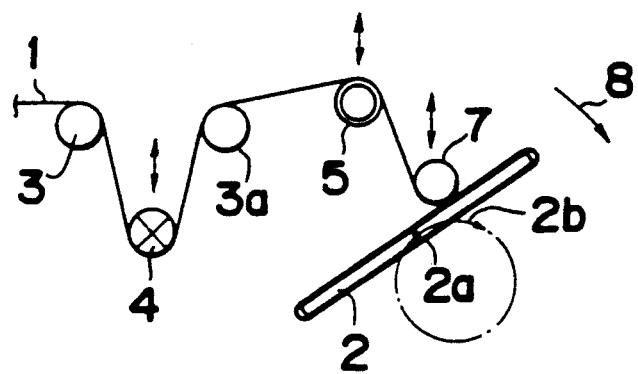
FIG. 1 is a side view of a first embodiment.

Before the description of the present invention proceeds, it is to be noted that like parts are designated by like reference numerals throughout the accompanying drawings.

The first embodiment of the present invention will be described with reference to the drawings.

Figure 2:
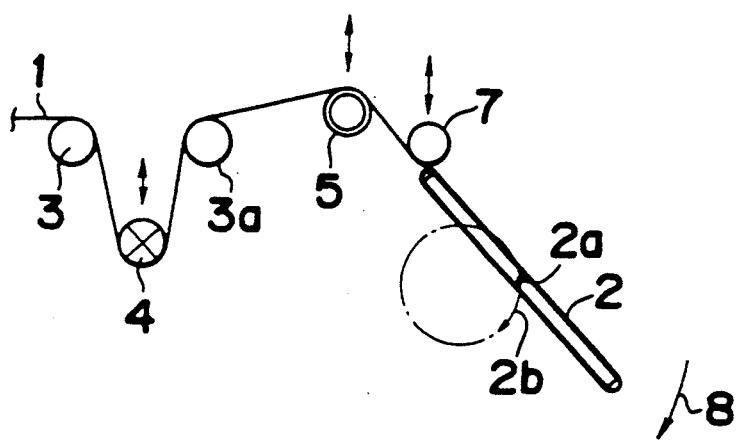
FIG. 2 is another side view of the first embodiment.

FIG. 1 and FIG. 2 show a first embodiment of the present invention, where the invention has been effected at a step of winding a laminated film (hereinafter referred to as film) around a plate bobbin 2 in the manufacturing operation of a laminated film capacitor. In the drawings, the film 1 is wound continuously around the plate bobbin 2 through pass rolls 3 and 3a for changing the direction of the film 1, a free dancer roll 4 so that the running speed of the film 1 before the pass roll 3 may be made constant, a forced dancer roll 5 and a nip roll 7. An arrow mark shown on a roll shows the reciprocating movement of the roll, in the direction of the arrow mark.

The plate bobbin 2 is rotated in the direction of the arrow mark 8 by a rotary shaft 2a, moving the rotary shaft 2a in one direction repeatedly in an arrow mark direction on an approximately circular locus 2b.

The rotary shaft of the nip roll 7, disposed approximately parallel to the rotary shaft 2a of the plate bobbin 2, is interlocked with the rotation of the plate bobbin 2 so as to repeatedly vertically reciprocate on the same movement locus in the direction of the arrow mark in the drawing. The nip roll 7 is continuously moved in one direction along the surface of the plate bobbin 2 to be rotated from above the above-described film 1 so as to depress the film 1 against the plate bobbin 2 for closely adhering the film 1 on the plate bobbin 2 and the nip roll 7 to wind it continuously. The support portion of the rotary shaft of the nip roll 7 is interlocked with the rotation of the plate bobbin 2 by a cam mechanism or the like so as to move the nip roll 7.

When the plate bobbin 2 is in the position shown in FIG. 1, the film 1 increases in speed in being wound around the plate bobbin 2. The forced dancer roll 5 is moved down so as to absorb the speed variation of the film 1 so that the running speed of the film 1 before the pass roll 3 may become constant. The movement of the forced dancer roll 5 is interlocked with the rotation of the plate bobbin 2 by a cam mechanism or the like.

The free dancer roll 4 absorbs the remaining varying portion of the film 1 when the above-described forced dancer roll 5 cannot absorb the variation in the running speed of the film 1.

When the plate bobbin 2 is in the position shown in FIG. 2, the face of the plate bobbin 2 is arranged in an approximately straight line with the forced dancer roll 5, and the speed of the film 1 to be wound around the plate bobbin 2 becomes small, so that the forced dancer roll 5 is moved so as to make constant the running speed of the film 1 before the pass roll 3.

Figure 24:
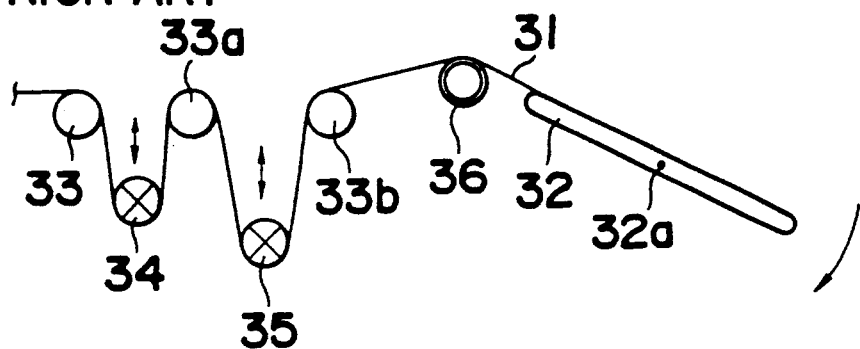
FIG. 24 is another side view of the conventional apparatus.
Figure 25:
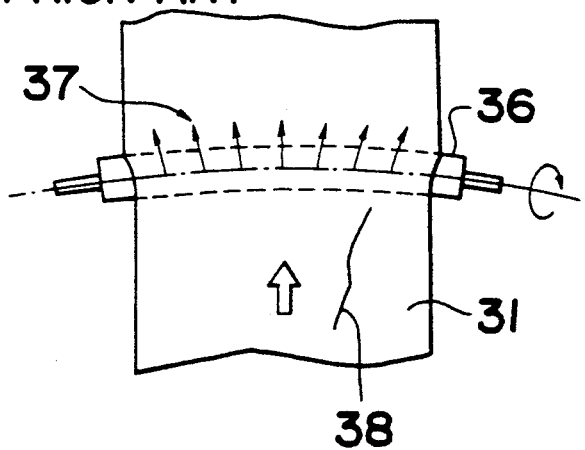
FIG. 25 is an operational view of an expander roll.
Figure 26:
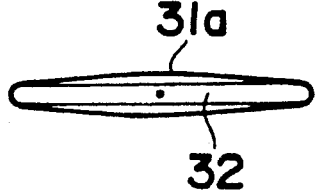
FIG. 26 is a side view showing a plate bobbin winding condition in the conventional apparatus.

In the conventional method, with the nip roll 7 not being provided, the rotation of the expander roll 36 becomes 0 in the position shown in FIG. 24. In the method of the present invention, even in FIG. 2, corresponding to FIG. 24, the forced dancer roll 5 is moved so that an easier operation can be effected so that the rotation of the forced dancer roll 5 may not be stopped.

Therefore, variations in the rotational speed of the forced dancer roll 5 can be made small, and variations in the tension of the film 1 can be made small.

Figure 3:
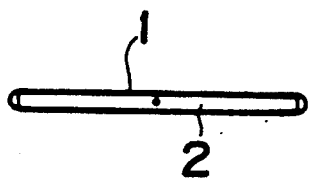
FIG. 3 is a side view showing a plate bobbin winding condition in the embodiment of FIG. 1 and FIG. 2.

The nip roll 7 depresses the film 1 against the plate bobbin 2, as described hereinabove, so as to continuously wind the films with the film 1 being pressed to the plate bobbin 2. As shown in FIG. 3, a better winding condition, with reduced air-swallowing, can be provided when the film 1 has been continuously wound around the plate bobbin 2.

Figure 4:
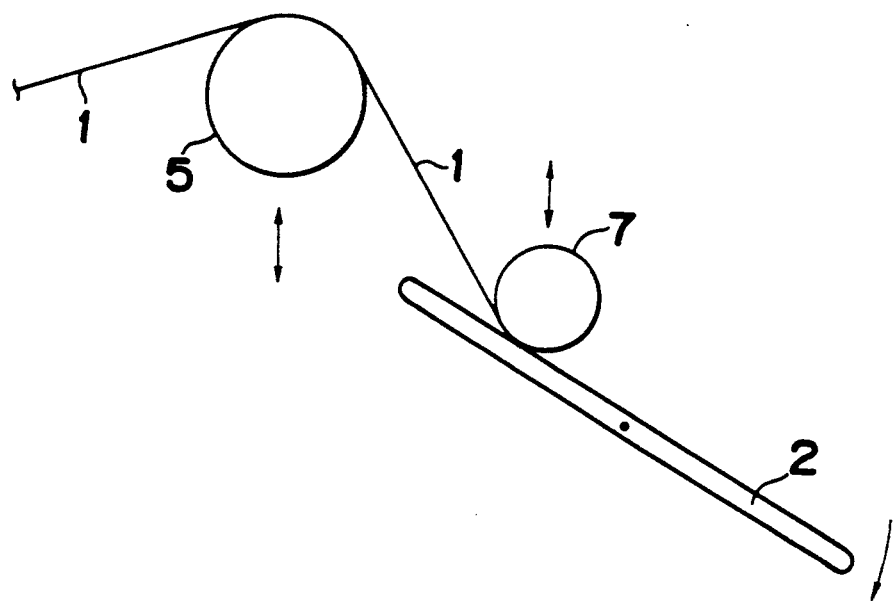
FIG. 4 is a side view showing a nip roll operation in FIG. 1 and FIG. 2.
Figure 5:
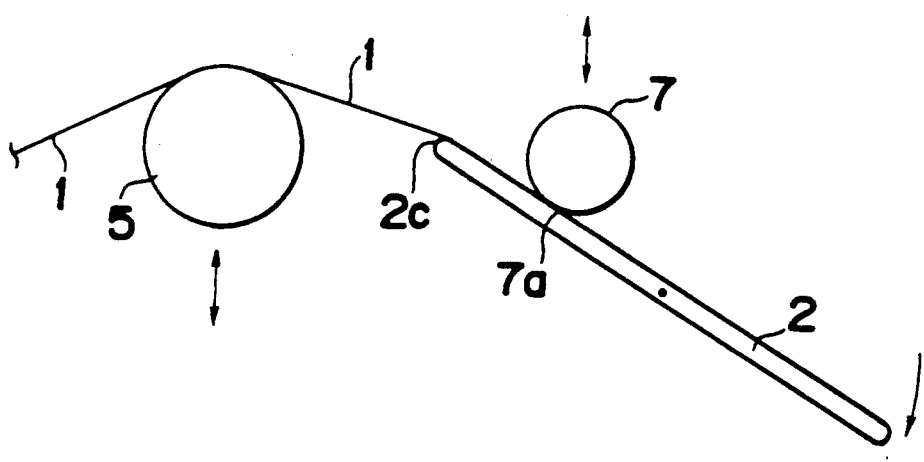
FIG. 5 is another side view showing the nip roll operation in the embodiment of FIG. 1 and FIG. 2.

The forced dancer roll 5 is disposed as shown in FIG. 4, so that the order of contact of film 1 against each roll always is, in position, the forced dancer roll 5, the nip roll 7 and the plate roll 2. In such a manner the wrinkles of the film 1 and air swallowing can be reduced. On the other hand, as shown in FIG. 5, when the film 1 is in contact with the plate bobbin 2 before the nip roller 7 in a certain position of the plate bobbin 2, the film 1 between the position 7a to the position 2c, shown in FIG. 5, comes into contact against the plate bobbin 2, and some air swallowing is caused, although only a little. Upon further rotation of the plate bobbin 2 from FIG. 5, the order of the contact changes. The film 1 has a moment of coming into contact with the plate bobbin 2 and then the nip roll 7 so that wrinkles are likely to be caused at this time. In the present embodiment, as shown in FIG. 4, the film 1 sets the reciprocating position of the forced dancer roll 5 so that the film may be wound in contact against the plate bobbin 2 after coming into contact with the nip roll 7 even in any position of the rotation of the plate bobbin 2.

Figure 6:
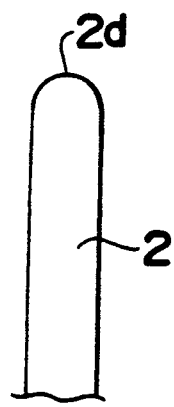
FIG. 6 is a side view showing the end edge shape of a plate bobbin in the embodiment of FIG. 1 and FIG. 2.

As shown in FIG. 6, the plate roll 2 makes an end edge shape 2d of the plate bobbin 2 approximately semicircular. The speed change of the film 1 can be made small when the nip roll 7 passes the end edge of the plate bobbin 2. The movement of the nip roll 7 can thus be made smooth.

In order to avoid interference between the laminated (wound) film 1 and the nip roll 7 when the nip roll 7 has wound many films 1, the movement locus lower dead point of the rotary shaft of the nip roll 7 is adapted to be separated from the plate bobbin 2 in accordance with the increase in the winding thickness of the film 1 on the plate bobbin 2. In order to avoid interference with the film 1 laminated (wound) by the nip roll 7, there is a way of having a spring component in the nip roll 7, and a way of separating the moving locus of the rotary shaft of the nip roll 7 from the plate bobbin 2. Because the method using the spring component is high in rotational speed, and slightly unsteady, the latter method is suitable. In this case the movement of the nip roll 7 is interlocked with the rotation of the plate bobbin 2. Many winding operations can be effected if the nip roll 7 and the whole moving mechanism portion of the rotary shaft thereof is separated form the plate bobbin 2, at a rate of 1 time or 1.5 times or so with respect to the increase in the lamination thickness, with a ball screw or the like interlocked with the plate bobbin 2.

Figure 7:
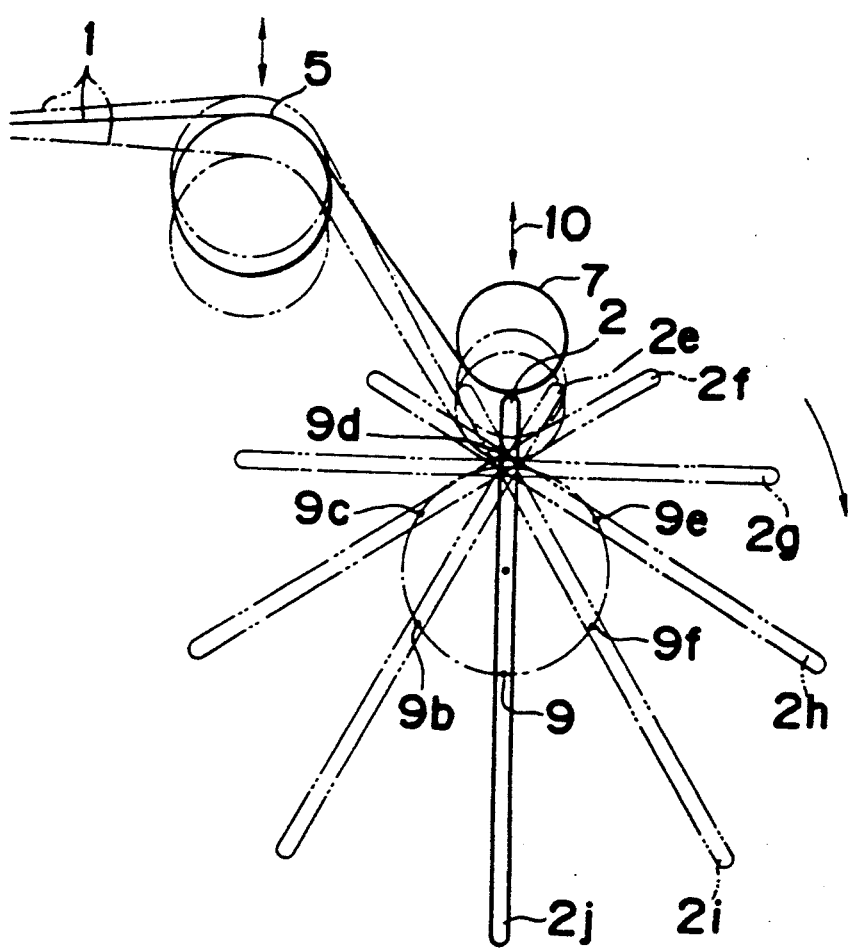
FIG. 7 shows side views of a forced dancer roll, a nip roll and a plate winding portion in the embodiment of FIG. 1 and FIG. 2.

The movement of the nip roll 7, the rotation of the plate bobbin 2, and the movement of the rotary shaft of the plate bobbin 2, as shown in FIG. 7, wind the film 1 continuously around the plate bobbin 2. The plate bobbin 2 rotates in the direction of an arrow mark by a rotary shaft repeatedly moving in the same direction as the arrow mark direction on an approximately circular locus parallel with the rotary shaft. The forced dancer roll 5 reciprocatingly moves the film 1 in the direction of the arrow mark so that the running speed of the feeding side (not shown) of the film 1 may be constant. A nip roll 7 reciprocates linearly in the vertical direction to wind the film 1 continuously around the plate bobbin 2 and press the film 1 against the plate bobbin 2.

The relation between the movement of the rotary shaft of the plate bobbin 2 and the rotation of the plate bobbin 2 is illustrated, with the plate bobbin 2 being adapted to rotate by 180 degrees along points $2 \rightarrow 2e \rightarrow 2f \rightarrow 2g \rightarrow 2h \rightarrow 2i \rightarrow 2j$ when the rotary shaft 9 of the plate bobbin 2 has moved by one cycle on an approximately circular locus in the direction of the arrow mark along points $9 \rightarrow 9b \rightarrow 9c \rightarrow 9d \rightarrow 9e \rightarrow 9f \rightarrow 9$. In this manner, the repetitive moving locus of the nip roll 7 becomes considerably small, as shown by arrow mark 10, and it becomes easy to effect a winding operation at a high speed.

Figure 8:
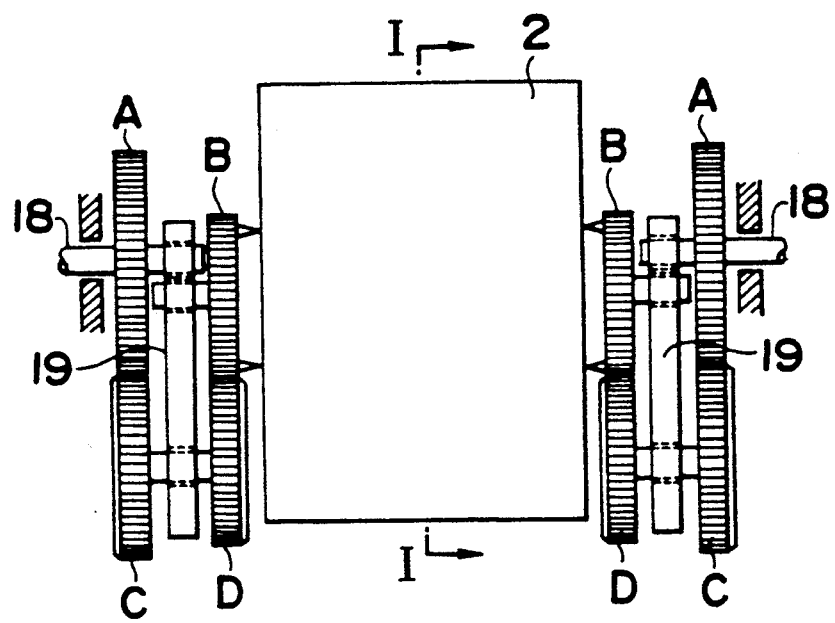
FIG. 8 is a front view of a plate winding portion in the embodiment of FIG. 1 and FIG. 2.
Figure 9:
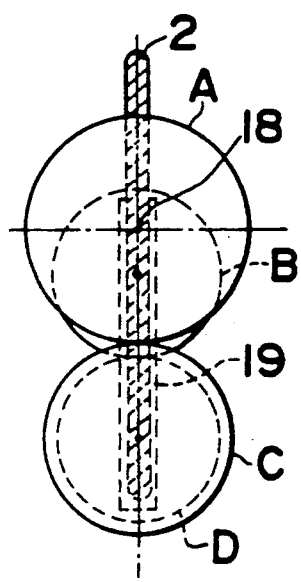
FIG. 9 is a side view of FIG. 8.
Figure 10:
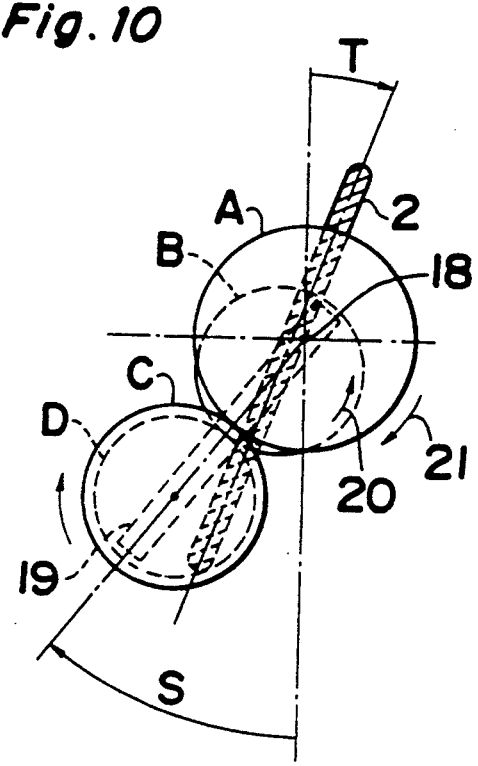
FIG. 10 is a side view of FIG. 8.

A plate winding apparatus is shown in FIG. 8 through FIG. 10. In FIG. 8 and FIG. 9, there is a gear A with a rotary shaft 18 being rotated in a given position. A coupling rod 19 has the rotary shaft 18 as a rotation center and is coupled to epicyclic gears B, C and D so as to rotate with the gear A as a rotation center. A plate bobbin 2 is mounted on the epicyclic gear B. The relation of the revolution of the gear A and the epicyclic gear B is obtained from the number of teeth of the gear A and the epicyclic gears B, C, D, and is designated Na to Nb. Na and Nb are positive numbers when the rotating direction of gear A is the same as that of gear B. Either Na or Nb is negative when the rotating direction of gear A and gear B are opposite. For example, assume that the tooth number of the gears A, C, D, B are 50, 40, 30, 36, and Na against Nb=40/50 against 30/36.

Assume that in FIG. 10 the coupling rod 19 is rotated with the rotary shaft 18 of the gear A as a rotation center, with the rotation of the gear A being stopped, and the epicyclic gears B, C and D are rotated in the direction of an arrow mark by an angle S (S in degrees). Then the epicyclic gear B is rotated in the direction of an arrow mark 20 by an angle of $[S \times Nb/Na]$ relative to the coupling rod 19. It is moved in the S direction by $[S \times (1 - Nb/Na)]$ with respect to absolute coordinates. Assume at the same time that the gear A is rotated by an angle $[S \times (0.5 \times (2 - Na/Nb))]$ in the direction of an arrow mark 21, and the epicyclic gear B is rotated by an angle of $$T=S\times(1-Nb/Na)+S\times\{0.5\times(2-Na/Nb)\}\times Nb/Na=S/2$$

with respect to the absolute coordinates. Namely, rotation angle T of the plate bobbin 2 becomes S/2.

When the epicyclic gear B is rotated by 360 degrees with the rotary shaft 18 of the gear A as a center, the plate bobbin 2 is rotated by 180 degrees. Especially assume that Na/Nb=2, and the gear A is not rotated and can be secured, thus resulting in a simple construction.

The second embodiment of the present invention will be described in accordance with the drawings.

Figure 11:
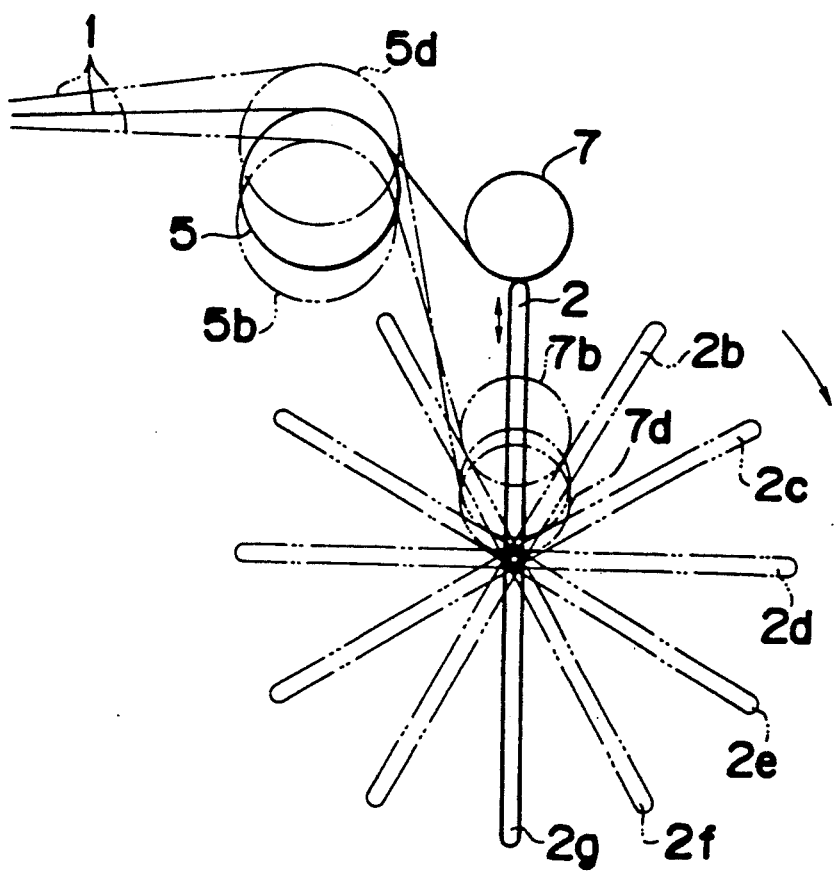
FIG. 11 is a side view of a second embodiment.
Figure 12:
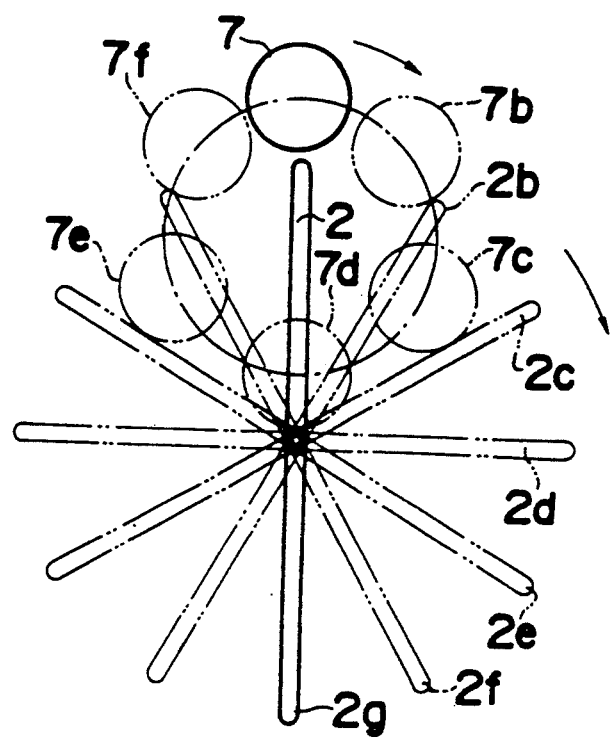
FIG. 12 is another side view of the second embodiment.

FIG. 11 and FIG. 12 show a second embodiment of the present invention, provided in a step of winding around the plate the laminated film (hereinafter referred to as film) in the manufacturing of the laminated film capacitor. In FIG. 11, the film 1 is wound continuously around the plate bobbin 2, being rotated in the arrow mark direction by a rotary shaft rotating in a given position. The film is wound through a forced dancer roll 5 provided so that the running speed of the feeding side (not shown) of the film 1 may become constant. A nip roller 7, continuously winding with the film 1, is depressed against the plate bobbin 2, being held against the plate bobbin 2.

The rotary shaft of the nip roll 7 is disposed approximately parallel to the rotary shaft of the plate bobbin 2, and is reciprocated by one cycle on a linear movement locus in the vertical direction of a length of approximately ½ or less of the length of the plate bobbin 2 in the running direction of the film 1 every time the plate bobbin 2 rotates by 180 degrees. The nip roll 7 is continuously rotating in the same direction along the surface of the plate bobbin 2 from above the film 1, and depresses the film 1 against the plate bobbin 2, holding the film 1 against the plate bobbin 2.

In order to wind the film 1 around the plate bobbin 2 at a high speed, it is necessary to make the inertia force of the moving nip roll 7 and the forced dancer roll 5 as small as possible. Thus, it is necessary to make the moving distance and the acceleration of the nip roll 7 and the forced dancer roll 5 as small as possible. The present embodiment realizes this.

In FIG. 11, the nip roll 7 reciprocatingly moves by one cycle on a linear movement locus in the vertical direction of a length of approximately ½ or less of the length of the plate bobbin 2 in the running direction of the film 1 between points 7→7b→7d→7b→7 when the position of the plate bobbin 2 has been rotated by 180 degrees along points 2→2b . . . 2d→. . . 2g, and the forced dancer roll 5 moves on a linear movement locus in the vertical direction between points 5→5b→5d→5b→5.

As the movement of the nip roll 7 and the forced dancer roll 5 is a reciprocating linear movement, or the movement distance is short, the respective rollings can both be performed easily with a cam and so on. Further, the high speed winding operation can be effected with high reliability.

In order to avoid interference between the laminated (wound) film 1 and the nip roll 7 when the nip roll 7 has wound many films 1, the movement locus of the rotary axis of the nip roll 7 is adapted to be separated from the plate bobbin 2 in accordance with the increase in the winding thickness of the film 1 on the plate bobbin 2. In order to avoid the interference between the laminated (wound) film 1 and the nip roll 7, there is a way of having a spring component on the nip roll 7 and a way of separating the moving locus of the rotary shaft of the nip roll 7 from the plate bobbin 2. The method using the spring component becomes slightly unstable in high speed rotation, but the latter method is suitable. In this case, the movement of the nip roll 7 is interlocked with the rotation of the plate bobbin 2. Many winding operations can be effected if the moving mechanism of the nip roll 7 is separated from the plate bobbin 2, at a rate of 1 time or 1.5 times or so with respect to the increase in the lamination thickness, by a ball screw or the like interlocked with the plate bobbin 2.

When the nip roll 7 has passed the end edge of the plate bobbin 2 in high speed rotation, the winding is likely to be unstable due to vibrations or the like. When the nip roll 7 is in the position at 7 in FIG. 11, the nip roll 7 is in contact against the plate bobbin 2 in FIG. 11. As an indicator, the nip roll 7 and the plate bobbin 2 are ideally several mm away from each other in this position.

When the plate bobbin 7 is in the rotation 2→2b, the nip roll 7 is required to move as much as 7→7b, and the acceleration becomes larger. In order to make the acceleration small, it is ideal to delay the rotational speed of the plate bobbin in this range.

In FIG. 12, the film 1 (not shown) is wound continuously around the plate bobbin 2 which is rotating in the direction of an arrow mark by the rotary shaft rotating in the given position, through the nip roll 7.

The rotary shaft of the nip roll 7 is disposed approximately parallel to the rotary shaft of the plate bobbin 2, and is rotated and moved by one cycle on an approximately circular movement locus of a diameter of approximately ½ or less of the length of the plate bobbin 2 in the running direction of the film 1 every time the plate bobbin 2 rotates by 180 degrees. The nip roll 7 moves continuously in the same direction along the surface of the plate bobbin 2, rotating from above the film 1 (not shown), depresses the film 1 against the plate bobbin 2 and holds the film 1 against the plate bobbin 2 so as to continuously wind it.

FIG. 12 shows that the nip roll 7 has been rotated by one cycle and moved in the direction of the arrow mark on the almost circular movement locus of the diameter of approximately ½ or less of the length of the plate bobbin 2 in the direction of 7→7b→7c→7d→7e→7f→7 when the position of the plate bobbin 2 has been rotated by 180 degrees from 2→2b→2c→2d→2e→2f→2g in the direction of the arrow mark.

In this case, if the plate bobbin 2 is rotated at a constant speed, the nip roll 7 is required to be rotated at a non-constant speed as shown in FIG. 12. As the nip roll effects its circular movement, the movement mechanism of a nip roll with reduced vibrations if the rotation is at high speed can be obtained with a simple apparatus using the rotational motion so that the high speed winding operation of the film 1 can be effected.

A third embodiment of the present invention will be described in accordance with the drawings.

Figure 13:
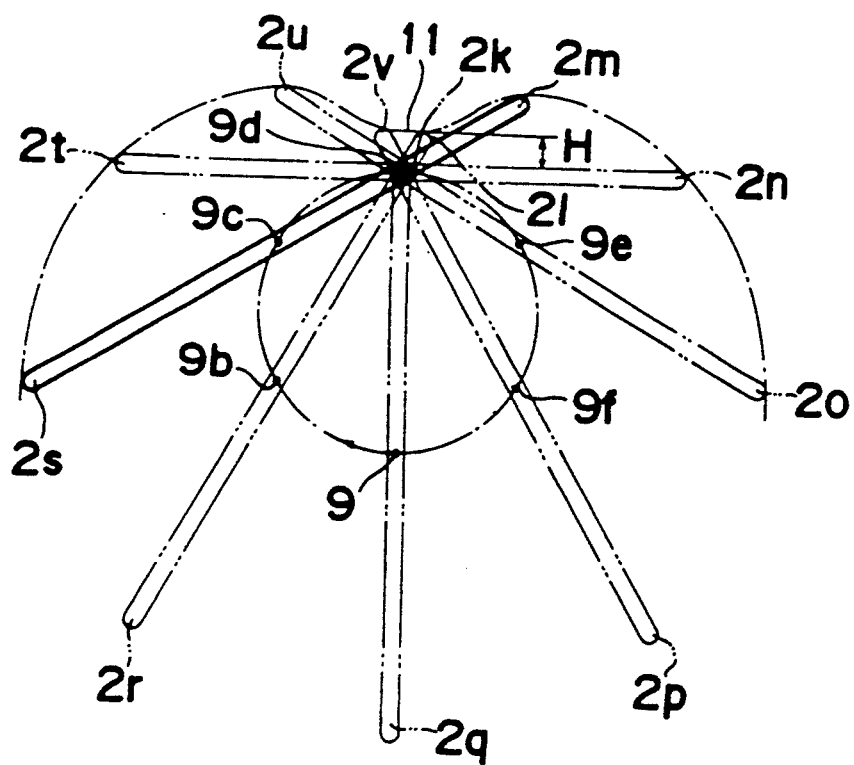
FIG. 13 is a side view of a third embodiment.

In FIG. 13, when the rotary shaft 9 of the plate bobbin 2 has moved by one cycle on an approximately circular locus in the direction of the arrow mark from 9→9b→9c→9d→9e→9f→9, and the plate bobbin 2 has been rotated by 180 degrees, the envelope lines 2k→2l→2m→2n→2o→2p→2q→2r→2s→2t→2u→2v→2k of the end edge of the plate bobbin 2 form a concave portion 11. The nip roll 7 (not shown) moves by one cycle on the reciprocating movement locus an extremely small distance, shown with a height H in FIG. 13, in the position of the concave portion 11.

As the inertia of the nip roll 7 becomes smallest in FIG. 13, the winding operation can be effected with the highest speed.

Figure 15:
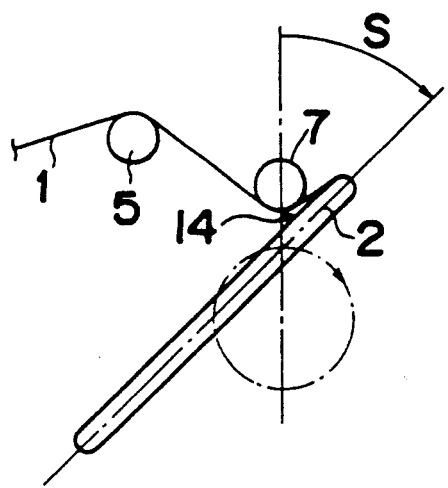
FIG. 15 is a side view of the fourth embodiment.
Figure 16:
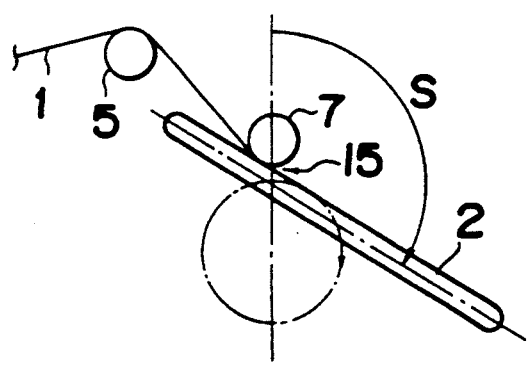
FIG. 16 is another side view of the fourth embodiment.

A fourth embodiment of the present invention will be described with reference to FIG. 14 through FIG. 16.

Figure 14:
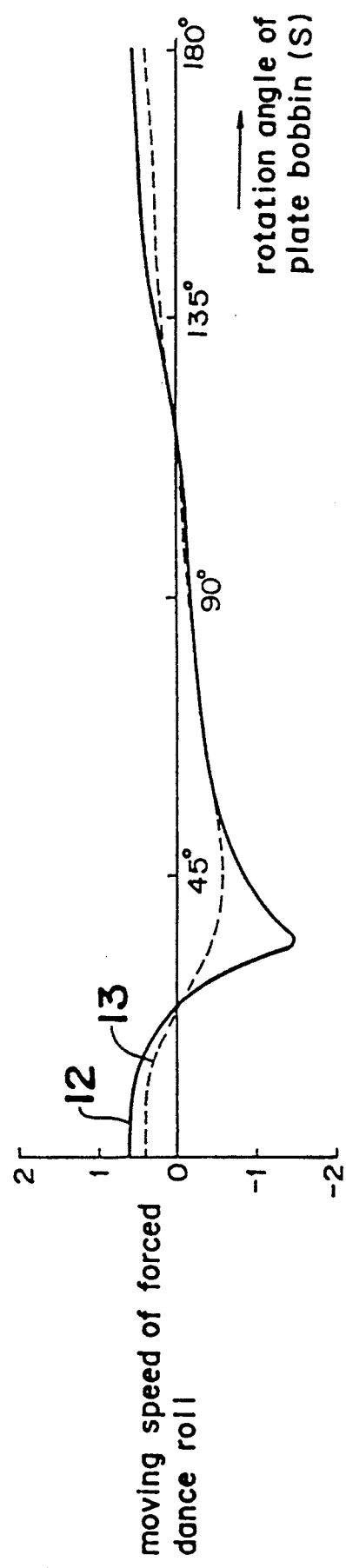
FIG. 14 is a graph showing a forced dancer roll moving speed in a fourth embodiment.

FIG. 14, which is an illustrative graph of the effect in a fourth embodiment, shows a rotation angle S of the plate bobbin 2 and a moving speed of the forced dancer roll 5. A curve line 12 is the moving speed of the forced dancer roll 5 in the first embodiment (FIG. 7), and the curve line 13 is the moving speed of the forced dancer roll 5 in the fourth embodiment (FIG. 15 and FIG. 16). As shown in FIG. 14, the moving speed of the forced dancer roll 5 becomes largest at the first half of the rotation angle of the plate bobbin 2. As shown in FIG. 15, as the speed of the plate bobbin 2 of the film 1 becomes larger in the range from 0 to 60 degrees of the above described rotary angle S, the moving speed of the forced dancer roll 5 becomes larger so as to make constant the running speed of the film 1 on the film supply side.

There is a method of making the rotation of the plate bobbin 2 lower in speed only in a certain range so as to lower the maximum value of the moving speed in the above described first half of the rotation angle for the forced dancer roll 5. In the method of the fourth embodiment of the present invention, as shown in FIG. 15 and FIG. 16, the film 1 is wound continuously around the plate bobbin 2, which is rotated in the direction of the arrow mark by the rotary shaft moving repeatedly in the direction of the arrow mark on an approximately circular locus parallel with the rotary shaft. The film 1 is wound through the forced dancer roll 5 so that the running speed on the feeding side (not shown) of the film 1 may becomes constant, and the nip roll 7 winds the film continuously, with the film 1 being pressed and held against the plate bobbin 2. An interval 14 between the nip roll 7 and the plate bobbin 2 is made slightly larger in the range from 0 degrees to 90 degrees in the rotating angle S of the plate roll 2. An interval 15 between the nip roll 7 and the plate bobbin 2 is made smaller in the range between 90 degrees and 180 degrees in the above described rotary angle S, so as to cause an approximately adhering condition.

When the above described interval 14 is made slightly large, the nip roll 7 serves, correspondingly, as a dancer roll, and the moving speed of the forced dancer roll 5 can be reduced as shown in the above described curved line 13 of FIG. 14. But the interval 14 is necessary to become large enough to tolerate the air swallowing of the film 1. The curved lines 12 and 13 show the effect of the present embodiment. As the maximum movement speed of the forced dancer roll 5 can be lowered, the winding operation of the film 1 can be further made higher in speed.

A fifth embodiment of the present invention will be described in accordance with the drawings.

Generally, the forced dancer roll and the expander roll are used in film winding operations. But the following contradicting conditions are necessary to these rolls.

Generally an angle made by a film entering the expander roll and a film coming out of the expander roll is proper from 100 degrees to 140 degrees. At an angle smaller than this, the expander roll does not function properly. The film contracts when the film comes into contact against the roll and expands at a separating point, and wrinkles are likely to be caused in the film. Therefore, the above described angle cannot be made smaller than 100 degrees.

On the other hand, the function of the forced dancer roll becomes better as the angle made by the film entering the forced dancer roll and the film coming out of the forced dancer roll becomes smaller (closer to parallel). In order to absorb the speed change in the film, a smaller moving distance suffices so as to make it possible to effect high speed operation.

Figure 17:
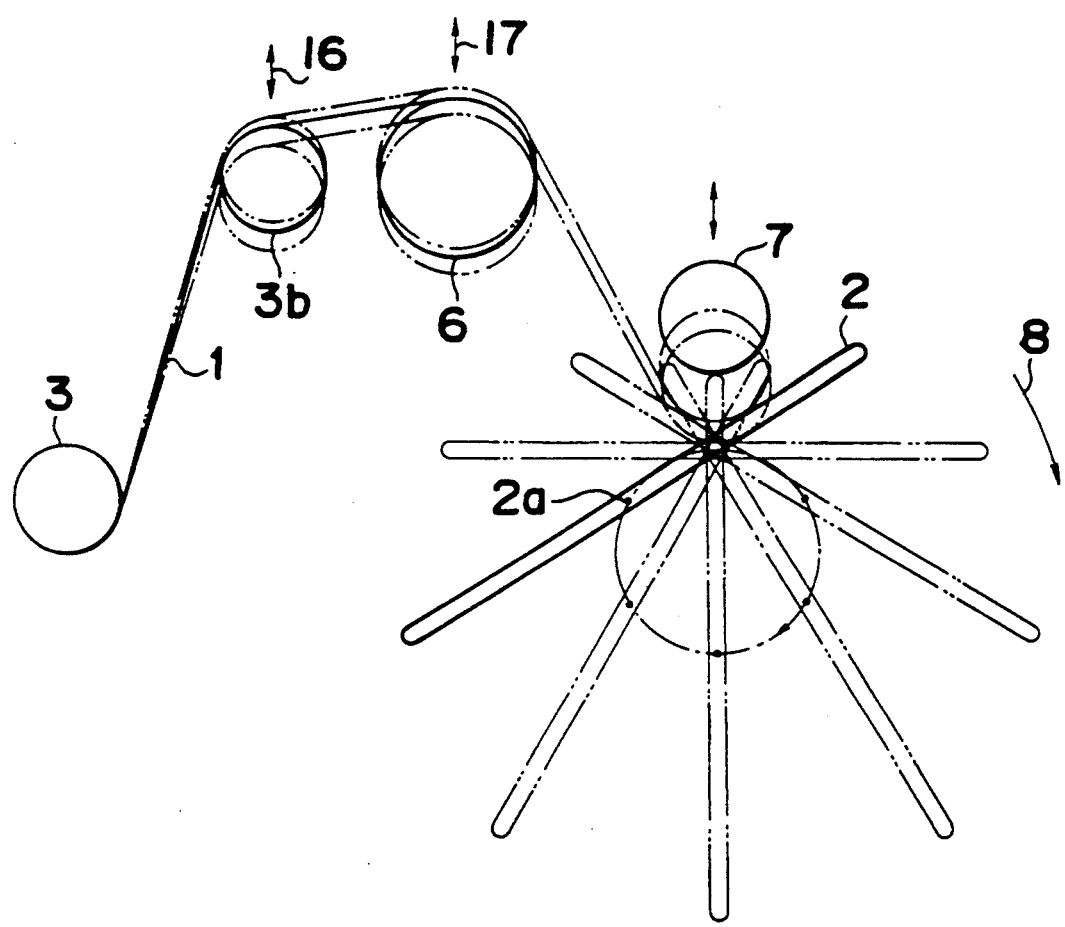
FIG. 17 is a side view of a fifth embodiment.

The present embodiment satisfies these contradicting conditions. In FIG. 17, the film 1 is wound around the plate bobbin 2 through a pass roll 3, whose rotary shaft does not move, a pass roll 3b and an expander roll 6 which function as a forced dancer roll, and a nip roll 7.

When the pass roll 3b and the expander roll 6 are moved in the directions of arrow marks 16 and 17 of FIG. 17 so as to function as the forced dancer roll, if an angle made by the film between the pass roll 3 and the pass roll 3b, and by the film between the expander roll 6 and the nip roll 7, is small (closer to parallel), the situation is better, making it possible to effect high speed operation, with the moving distance for achieving the function being small. According to the method of the present embodiment, namely, a method where the forced dancer roll is composed of the expander roll and the pass roll separately moving vertically, the film between the pass roll 3 and the pass roll 3b can be made vertically closer to the film between the expander roll 6 and the nip roll 7, with an interval being retained between the expander roll and the pass roll, so that the above described contradicting conditions can be satisfied at the same time.

A sixth embodiment of the present invention will be described with reference to FIG. 18 and FIG. 19.

Figure 18:
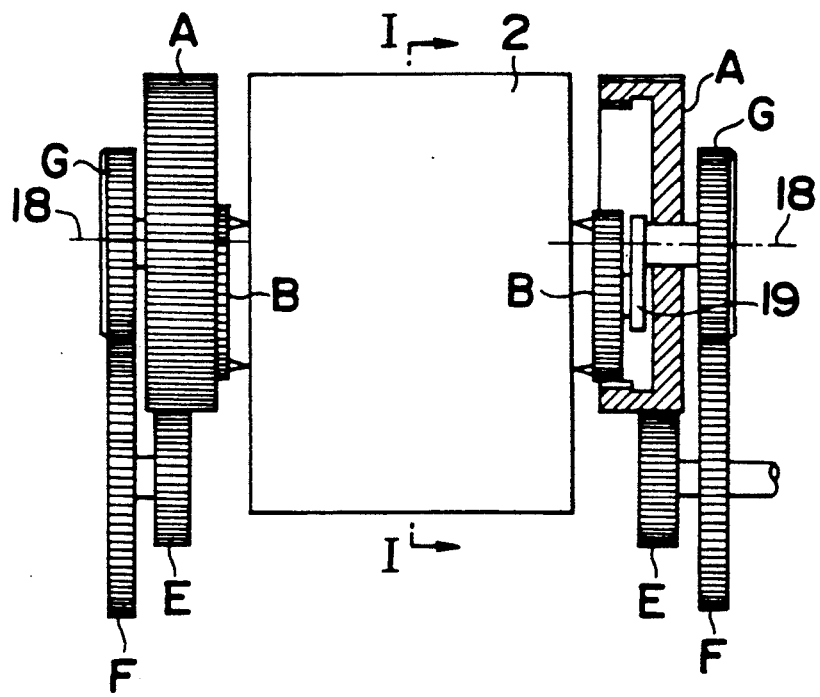
FIG. 18 is a front view of a sixth embodiment.

In FIG. 18, rotary shafts 18 have inner and outer two-sided gears A to be rotated in a given position. Epicyclic gears B are rotated along the inner teeth of the two-sided gears A. The plate bobbin 2 is mounted on the epicyclic gear B. Gears E, F and G are gears for driving the two-sided gear A and a gear for driving the epicyclic gear B. The gear G and the epicyclic gear B are coupled with a coupler rod 19. The relation of the revolution number between the gear A and the epicyclic gear B obtained from the number of teeth of the gears A and the epicyclic gear B and the gears E, F and G are Na against Nb. Na and Nb are positive numbers when the rotating direction of gear A is the same as that of gear B. Either Na or Nb is a negative number when the rotating directions of gear A and gear B are opposite.

Figure 19:
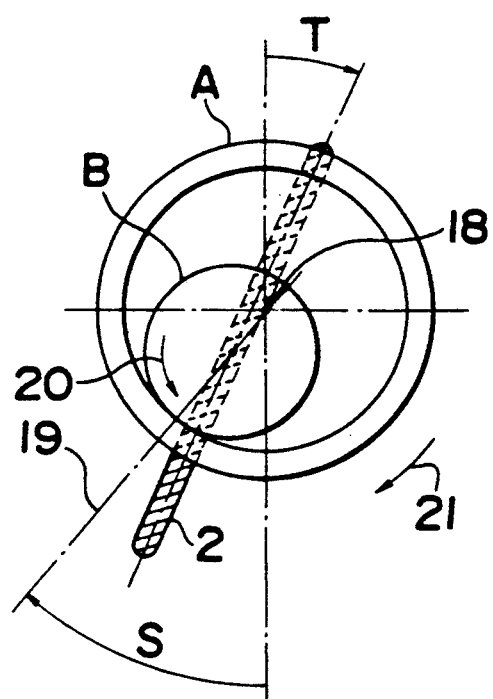
FIG. 19 is a side view of the sixth embodiment.

In FIG. 19, when the epicyclic gear B is rotated and moved in the direction of an arrow mark by angle S with the rotary shaft 18 as the rotation center, the gear A is rotated by an angle of $[S \times \{0.5 \times (2 - Na/Nb)\}]$ at the same time in the direction of an arrow 21. The epicyclic gear B is rotated in the direction of an arrow mark 20 by an angle of $[S \times Nb/Na]$ relative to the coupling rod 19, and also, rotates by an angle of $[T = S/2]$, as in the embodiment of FIG. 10 and FIG. 8, with respect to the absolute coordinates.

Accordingly, when the epicyclic gear B is moved, rotated by 360 degrees with the rotary shaft 18 as a shaft, the plate bobbin rotates by 180 degrees. Especially in $[Na/Nb=2]$, two-sided gear A can be secured without being rotated so as to simplify the construction.

A seventh embodiment of the present invention will be described with reference to FIG. 20 and FIG. 21.

Figure 20:
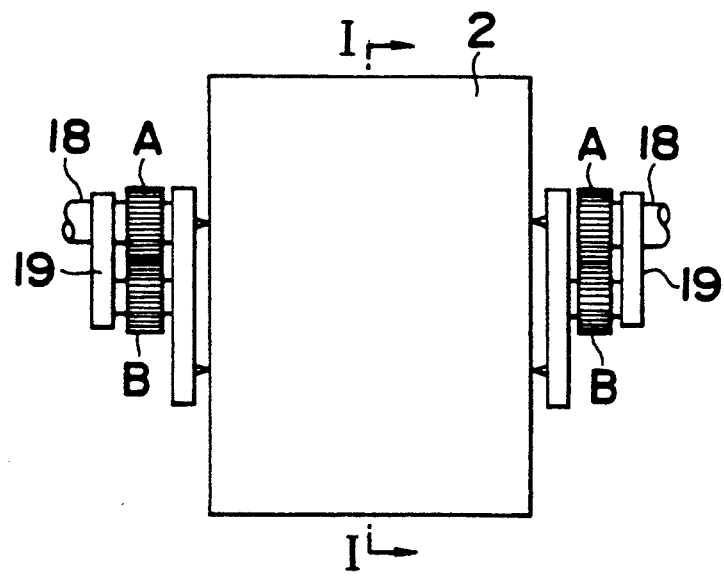
FIG. 20 is a front view of a seventh embodiment.

In FIG. 20, the rotary shaft 18 is a gear A to be rotated in a given position, and an epicyclic gear B is rotated along the gear A. The plate bobbin 2 is mounted on the epicyclic gear B. The rotary shaft of the gear A and the epicyclic gear B is coupled with a coupler rod 19. The relation of the revolution number between the gear A and the epicyclic gear B obtained from the number of teeth of the gear A and the epicyclic gear B is Na to Nb. Na and Nb are positive numbers when the rotating direction of gear A in the same as gear B. Either Na or Nb is a negative number when the rotating direction of gear A and gear B are opposite.

Figure 21:
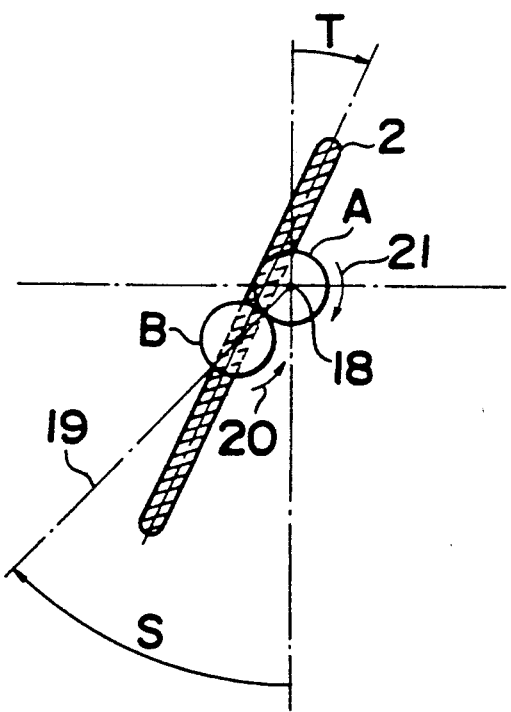
FIG. 21 is a side view of the seventh embodiment.
Figure 22:
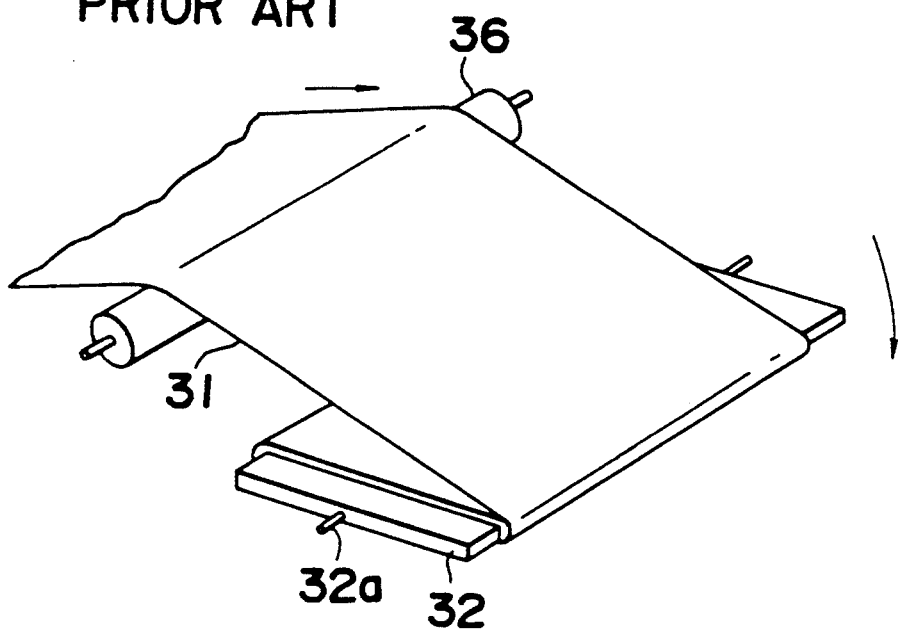
FIG. 22 is a perspective view of a conventional apparatus.
Figure 23:
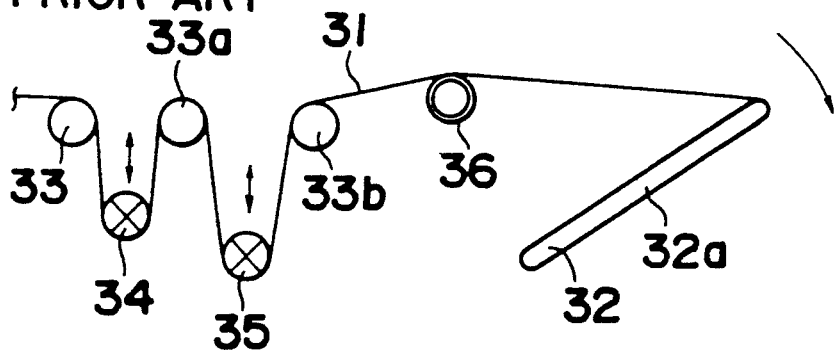
FIG. 23 is a side view of the conventional apparatus.

In FIG. 21, when the epicyclic gear B is rotated and moved in the direction of an arrow mark by an angle S with the rotary shaft 18 as the rotation center, the gear A is rotated by an angle $[S \times \{0.5 \times (2-Na/Nb)\}]$ at the same time in the direction of an arrow 21, the epicyclic gear B is rotated in the direction of an arrow mark 20 by an angle $[S \times Nb/Na]$ relative to the coupling rod 19, and also rotates by an angle $[T=S/2]$, as in the embodiment of FIG. 10 and FIG. 8, with respect to the absolute coordinates.

Accordingly, when the epicyclic gear B is moved, rotated by 360 degrees with the rotary shaft 18 as a shaft, the plate bobbin rotates by 180 degrees.

The present embodiment has advantages in that there is only one epicyclic gear as compared with the embodiment FIG. 8 through FIG. 10 and the gear is smaller and better as compared with the embodiments of FIG. 18 and FIG. 19.

As is clear from the foregoing description, according to the arrangement of the present invention, a plate winding method of a long sheet of the first feature of the present invention has steps enabling the use of the nip roll, the plate bobbin winding operation of a film which has no swallowing, is better in accuracy by a method of continuously moving the rotary shaft of the plate bobbin on the approximately circular locus in parallel to the rotary shaft as described in the first feature of the present invention, with an effect of improving the performance of the laminated capacitor.

A plate winding method of the second feature has steps enabling the use of the nip roll, enabling the plate bobbin winding operation of the film with better accuracy, without swallowing air by a process of moving by one cycle, on a certain moving locus, the rotary shaft of the nip roll each time the plate bobbin rotates by 180 degrees, as described in the second feature of the present invention, making the maximum distance between two points on the moving locus approximately ½ or less in the length of the plate bobbin in the running direction of the film, with the effect that the performance of the laminated capacitor is improved.

In the first feature or the second feature of the present invention as described in the third feature of the present invention, the forced dancer roll is disposed before the nip roll, with the effect that the high speed winding operation can be effected, in addition to the first feature or the second feature.

In the first feature of the present application, as described in the fourth feature of the present invention, the plate bobbin is rotated by 180 degrees each time the rotary shaft of the plate bobbin is moved by one cycle on the approximately circular movement locus, with the effect that the high speed winding operation can be effected, with the movement distance of the nip roll being made smaller, in addition to the effect of the first feature.

In a plate winding method described in the fourth feature, as described in the fifth feature of the present invention, the envelope line of the end edge of the rotating plate bobbin has a concave portion, with the effect that high speed winding can be effected, with the movement distance of the nip roll being made smaller in addition to the fourth feature.

In the first feature or the second feature of the present invention, the movement locus of the rotary shaft of the nip roll is separated from the plate bobbin in accordance with the increase in the winding thickness of the film on the plate bobbin, as described in the sixth feature of the present invention, with the effect that the nip roll can avoid interference with the laminated (wound) film, in addition to the first feature and the second feature.

In the first feature or the second feature of the present invention, as described in the seventh feature of the present invention, assume that the interval between the nip roll and the plate bobbin is an interval value, for the plate bobbin rotated by 90 degrees from the vertical direction, greater than or equal to an interval value for the plate bobbin rotated from a position exceeded by 90 degrees with respect to the vertical direction to 180 degrees, a dancer roll effect is provided with the nip roll, in addition to the first invention or the second invention, and a high speed winding operation can be effected with the moving distance and inertia of the forced dancer roll being made small.

In a plate winding method described in the third feature, as described in the eighth feature of the present invention, the forced dancer roll is composed of an expander roll and a pass roll separately vertically moving with an interval therebetween, being moved together and interlocked, so that a high speed winding operation using the expander roll can be effected in addition to the effect of the third feature.

The plate winding apparatus according to the third feature has a step so that the first feature can be embodied with a simple construction with the combination construction of the gears and the epicyclic gears, and the teeth number being constructed properly as described in the ninth feature of the present invention.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A method of winding a long sheet around a plate, comprising the steps of:

while continuously winding the long sheet on a plate bobbin, moving a rotary axis of the plate bobbin in one direction on an approximately circular locus; and repeatedly moving a rotary axis of a nip roll along a movement locus so that the nip roll, which is disposed approximately parallel to the rotary axis of the plate bobbin, moves continuously along the surface of the plate bobbin so as to be rotated from above the long sheet such that, while the long sheet is being continuously wound on the plate bobbin, the long sheet is depressed against the plate bobbin by the nip roll.

2. The method of claim 1, wherein the plate bobbin is rotated by 180 degrees each time the rotary axis of the plate bobbin moves 360 degrees on the approximately circular locus.

3. The method of claim 2, wherein the plate bobbin has an end edge which defines an envelope line during rotation of the plate bobbin on its rotary axis and movement of the rotary axis on the approximately circular locus, the envelope line being a convex curve having a concave portion therein.

4. A method of winding a long sheet around a plate, comprising the steps of:

rotating a plate bobbin on a rotary axis thereof and winding a long sheet on the plate bobbin; and moving a rotary axis of a nip roll along a repeating movement locus one cycle for each 180 degrees of rotation of the plate bobbin so that the nip roll, disposed approximately parallel to the rotary axis of the plate bobbin, moves continuously in one direction along the surface of the plate bobbin so as to be rotated from above the long sheet such that, while the long sheet is being wound on the plate bobbin, the long sheet is depressed against the plate bobbin by the nip roll, and wherein the maximum length between two end points of the repeating movement locus in approximately one half or less the length of the plate bobbin in the direction in which the long sheet is wound on the plate bobbin.

5. The method of claim 1 or 4, and further comprising the steps of:

moving a forced dancer roll in coordination with movement of the plate bobbin and the nip roll so that the forced dancer roll engages the long sheet and maintains a running speed of the long sheet approximately constant at a point before engaging the forced dancer roll.

6. The method of claim 5, wherein the forced dancer comprises an expander roll and a pass roll that are interlocked so as to move together.

7. The method of claim 1 or 4, wherein, in said step of moving the rotary axis of the nip roll along the movement locus, separating the nip roll from the plate bobbin by corresponding movement of said movement locus in correspondence with an increase of the thickness of the long sheet wound on the plate bobbin.

8. The method of claim 1 or 4, wherein the nip roll is separated from the plate bobbin by an interval, the interval at an angle of the plate bobbin of 0°–90° from a vertical position of the plate bobbin being greater than or equal to the interval at an angle of the plate bobbin greater than 90°.

9. A plate winding apparatus, comprising:

a first gear rotatably mounted at a given position so as to be rotatable about a rotary axis;

an epicyclic gear rotatably engaged with said first gear such that a rotary axis of said epicyclic gear is moved along a circular movement locus about the rotary axis of said first gear; and a plate bobbin mounted on said epicyclic gear such that said plate will rotate about the rotary axis of said epicyclic gear;

wherein said first gear and said epicyclic gear have a gear ratio such that said plate bobbin rotates 180° each time the rotary axis of said epicyclic gear is moved 360° along said circular movement locus.

10. The apparatus of claim 9, wherein a nip roll is movably disposed on an upper surface of said plate bobbin for movement along a movement locus, said nip roll holding a long sheet to be wound on to said upper surface.

11. The apparatus of claim 10, wherein a forced dancer roll engages said long sheet before said long sheet engages said nip roll and said plate bobbin.

12. The apparatus of claim 11, wherein said forced dancer roll comprises a pass roll and an expander roll interlocked for movement together.

* * * * *

UNITED STATES PATENT AND TRADEMARK OFFICE
CERTIFICATE OF CORRECTION

PATENT NO. : 5,312,064
DATED : May 17, 1994
INVENTOR(S) : Yuji Uesugi et al.

It is certified that error appears in the above-indentified patent and that said Letters Patent is hereby corrected as shown below:

On the title page, item [75], change "Kunami" to --Funami--.

Signed and Sealed this

Thirteenth Day of September, 1994

Attest:

BRUCE LEHMAN

*Attesting Officer*      *Commissioner of Patents and Trademarks*